UNITED STATES PATENT OFFICE.

ALONZO MARION POE, OF LAKEPORT, CALIFORNIA.

COUGH MIXTURE.

SPECIFICATION forming part of Letters Patent No. 395,346, dated January 1, 1889.

Application filed January 17, 1888. Serial No. 261,007. (No specimens.)

*To all whom it may concern:*

Be it known that I, ALONZO MARION POE, a citizen of the United States, residing at Lakeport, in the county of Lake and State of California, have invented a certain new and useful Improvement in Cough Mixtures; and I do hereby declare that the following is a full, clear, and exact description of the same.

The present invention has for its object to provide a cough mixture for the relief of coughs and colds and to heal the lungs and relieve the irritation incident thereto; and the compound or mixture consists of the following ingredients in substantially the proportions stated: Spikenard, eight ounces, washed and dried and boiled in six pints of water, and continue boiling until it makes three pints of infusion; eucalyptus, eight ounces (leaves) in six pints of water boiled to three pints of infusion; yerba-santa, eight ounces in six pints of water boiled to three pints of infusion; mullein, (leaves,) eight ounces in four pints of water boiled to two pints of infusion; hoarhound, (leaves,) eight ounces in four pints of water boiled to two pints of infusion. Add one ounce of oil of tar mixed with sugar.

The above ingredients are mixed together and about one and one-half pint alcohol added, with a sufficient amount of sugar to make a sirup, when it is ready for use.

The mixture is to be taken as follows: for adults, a teaspoonful every two hours, and for children half the quantity.

The mixture makes a very effective remedy for coughs and colds, and the ingredients have superior remedial qualities for the purpose. Spikenard has the virtue of healing the lungs after the mucous has been loosened; eucalyptus allays any fever in the mucous membrane of the lungs; yerba-santa effectively loosens the cough and acts as a tonic to the system; mullein also loosens the cough and arrests fever; hoarhound and licorice assist in loosening the cough and allay the fever, and oil of tar heals the diseased tissues of the lungs, in addition to loosening the cough.

What I claim as new, and desire to secure by Letters Patent, is—

The herein-described cough mixture, consisting of eucalyptus, spikenard, yerba-santa, mullein, hoarhound, licorice, and oil of tar, substantially in the proportions named.

In testimony that I claim the above I have hereunto subscribed my name in the presence of two witnesses.

ALONZO MARION POE.

Witnesses:
GEORGE A. LYON, Jr.,
ORLANDO MCCRANEY.